US005930884A

United States Patent [19]

Kammeraad et al.

[11] Patent Number: 5,930,884

[45] Date of Patent: Aug. 3, 1999

[54] TOOL AND METHOD FOR MOUNTING A COUPLER OF A BREAK-AWAY REARVIEW MIRROR ASSEMBLY ONTO A VEHICLE-MOUNTED BASE

[75] Inventors: David A. Kammeraad; R. Clayton McKeon, both of Holland, Mich.

[73] Assignee: K-Line Industries, Inc., Holland, Mich.

[21] Appl. No.: 08/823,796

[22] Filed: Mar. 24, 1997

[51] Int. Cl.$^{6}$ .................................................... B23P 11/02

[52] U.S. Cl. ................................ 29/453; 29/267; 29/270

[58] Field of Search ............................ 29/446, 453, 468, 29/267, 278, 270; 254/120, 131

[56] References Cited

U.S. PATENT DOCUMENTS

| | | | |
|---|---|---|---|
| 3,029,503 | 4/1962 | Meyer | 29/278 |
| 3,075,284 | 1/1963 | Salazar | 29/267 |
| 4,108,026 | 8/1978 | Anderson et al. | 29/278 |
| 4,240,192 | 12/1980 | Davis | 29/278 |
| 4,768,271 | 9/1988 | Jacob et al. | 29/267 |
| 5,075,945 | 12/1991 | Krzecki | 29/267 |
| 5,377,949 | 1/1995 | Haan et al. . | |

OTHER PUBLICATIONS

1995 Special Service Tools Catalog for Ford & Lincoln–Mercury Cars and Trucks, Mar. 1994, pp. 10–10.

*Primary Examiner*—David P. Bryant
*Attorney, Agent, or Firm*—Price, Heneveld, Cooper, DeWitt & Litton

[57] ABSTRACT

A tool is disclosed for snapping a coupler of a rearview mirror assembly onto a base mounted to a vehicle. The tool includes a handle, a shaft attached to and extending outward from the handle, and a structural configuration formed on an end of the shaft opposite the handle for simultaneously engaging both the coupler of the rearview mirror assembly and the base when the coupler is initially partially engaged with the base, and for moving the coupler relative to the base in response to a levering force applied to the handle until the coupler of the rearview mirror assembly is slid into full engagement with the base. To move the coupler in this manner, the tool directly applies a levering force to an interior surface of a rear wall of the coupler in response to a directional force applied to the handle. The structural configuration at the end of the tool shaft that translates the directional force to the levering force includes a notch cut at an angle into a surface of the shaft proximate the end of the shaft, and an inclined end surface formed at this same end of the shaft. Additionally, the shaft may include a bend to permit use of the tool in confined spaces.

21 Claims, 4 Drawing Sheets

TOOL AND METHOD FOR MOUNTING A COUPLER OF A BREAK-AWAY REARVIEW MIRROR ASSEMBLY ONTO A VEHICLE-MOUNTED BASE

BACKGROUND OF THE INVENTION

The present invention generally relates to a tool. More specifically, the present invention relates to a tool and a method for mounting a coupler of a rearview mirror assembly to a base mounted to the interior of a vehicle.

Recently, rearview mirror mounting mechanisms have been designed that readily break away from the portion of a vehicle to which the rearview mirror assembly is mounted in the event of an accident. An example of one such mounting mechanism is disclosed in U.S. Pat. No. 5,377,949 issued to Haan et al. and assigned to Donnelly Corporation of Holland, Mich. The mounting mechanism disclosed in the Haan et al. patent is shown in FIGS. 4–7 and described below.

As shown in FIG. 4, the rearview mirror assembly 100 includes a mirror housing 105 that is pivotally mounted to a mounting arm 107 by a ball and socket structure. Mounting arm 107 includes a socket at an opposite end for pivotally mounting arm 107 to a ball 132 of a coupler 110. The ball 132 extends from the main body 112 of coupler 110 via an extension arm 134.

To allow the rearview mirror assembly to break away from a mounting base secured to the vehicle windshield while preventing the rearview mirror assembly from vibrating, the coupler of the rearview mirror assembly must be firmly yet releasably engaged with the base that is adhered to the windshield. To accomplish both of these goals, coupler 110 (FIGS. 4 and 5) of the mounting mechanism disclosed in the Haan et al. patent has a spring clamp retainer band 114 with two flange portions 116 that extend forward and inward to firmly engage dove-tailed side surfaces 158 of a base 150, which is secured to a vehicle windshield 160. The detailed construction of this mounting mechanism is described below with reference to FIGS. 4–7.

As best shown in FIGS. 5 and 6, base 150 includes a front surface 152 that is secured by an adhesive to the vehicle windshield 160. Additionally, base 150 includes a rear surface 155 that is larger in lateral dimensions than front surface 152 due to the taper of dove-tailed side surfaces 158. In addition to being tapered from front to rear along side surfaces 158, base 150 is tapered at top end 154 such that bottom end 156 is wider than top end 154. As will be apparent from the following description of coupler 110, this additional taper is provided to facilitate the sliding of coupler 110 over base 150.

As shown in FIGS. 4, 5, and 7, coupler 110 includes a body portion 112 and a retaining clip 114 which wraps around a central rear portion of coupler body 112. Coupler body 112 is preferably formed of a die-cast steel and includes a recess formed in its forward surface for receiving base 150. This forward recess and coupler body 112 is confirmed by a bottom base contact surface 118, a front wall 120 which extends perpendicular to bottom base contact surface 118, a rear wall 124, and flange portions 116 formed at opposite sides of retaining band 114. The interior surface of front wall 120 defines a stop surface 122 which contacts top end 154 of base 150 when coupler 110 is fully engaged and secured to base 150. Similarly, rear wall 124 defines a pair of shoulders 126 which snap down over bottom end 156 of base 150 once coupler 110 is slid over base 150 far enough that top end 154 of base 150 is stopped by stop surface 122. It will thus be appreciated that the recess formed in the forward portion of coupler 110 is of nearly the exact dimensions of rear surface 155 of base 150 and that flanges 116 of retaining clip 114 extend around dove-tailed side edges 158 of base 150 to firmly grip and secure base 150 within this forward recess of coupler 110. As shown in FIG. 4, coupler 110 of rearview mirror assembly 100 is slid down over base 150 after base 150 is adhered to windshield 160 such that top end 154 enters the recess in the forward portion of coupler 110 from its bottom end.

Coupler body 112 may additionally include an elongated deeper recess 128 formed in the lower portion of the recess provided in the forward side of coupler 110. Elongated recess 128 is provided to reduce the amount of material used to construct coupler body 110. A slot 130 is formed in rear wall 124 in communication with elongated recess 128. As will be discussed in more detail below, slot 130 is not formed as deep as elongated recess 128 such that an inner surface 129 of rear wall 124 is provided across the bottom rear end of coupler 110.

Although the Haan et al. patent states that the coupler 110 of rearview mirror assembly 100 may be slid over and secured to base 150 without the use of any form of tool, it has subsequently been discovered that the spring force that the retainer clip must exert along the dove-tailed sides 158 of base 150 must be increased to prevent mirror vibration. With this increased force applied by the retaining band, however, up to 90 pounds of pressure must be applied to the coupler to bring it into full engagement with the base. Because this amount of force is too great to permit the rearview mirror assemblies to be mounted by hand, there exists a need for a tool that allows for individuals to quickly and easily mount a rearview mirror assembly to a base during manufacture as well as subsequent repair procedures.

SUMMARY OF THE INVENTION

It is therefore an aspect of the present invention to solve the above problems by providing a tool that allows an individual to quickly and easily secure a rearview mirror assembly to a base. It is another aspect of the present invention to provide a tool that is simple in construction and low in cost. Yet another aspect of the present invention is to provide a tool that reduces the force required to be applied by an individual when securing a rearview mirror assembly to a base. Still yet another aspect of the present invention is to provide a tool that may be used in the confined environment adjacent the central portion of a vehicle windshield to which such rearview mirror assemblies are typically attached. An additional aspect is to provide a tool that is capable of applying a levering force directly to an interior surface of a rear wall of a coupler of a rearview mirror assembly.

To achieve these and other aspects and advantages, the tool constructed in accordance with the present invention comprises a handle, a shaft attached to and extending outward from the handle, an inclined end surface formed on an end of the shaft opposite the handle, and a notch formed in the shaft for engaging a coupler of a rearview mirror assembly. The tool of the present invention is used after the coupler of the rearview mirror assembly is initially partially engaged with a base that is mounted to a vehicle, by bringing the notch into engagement with the coupler and the inclined end surface into engagement with the base, and by applying a force to the handle to move the coupler relative to the base through a lever action until the coupler is slid into full engagement with the base. The shaft of the tool may be formed with one or more bends to allow the tool to be used within the close confines within the interior of a vehicle in the vicinity of the rearview mirror.

These and other features, advantages, and objects of the present invention will be further understood and appreciated by those skilled in the art by reference to the following specification, claims, and appended drawings.

DETAILED DESCRIPTION OF PREFERRED EMBODIMENTS

In the description of the invention below, references are made to the orientation of (i.e., bottom, upper, lower, front, rear, etc.) of the components for purposes of description only. It will be appreciated that the relative orientation of the invention and other components may be changed without departing from the spirit and scope of the invention.

Figure 2:
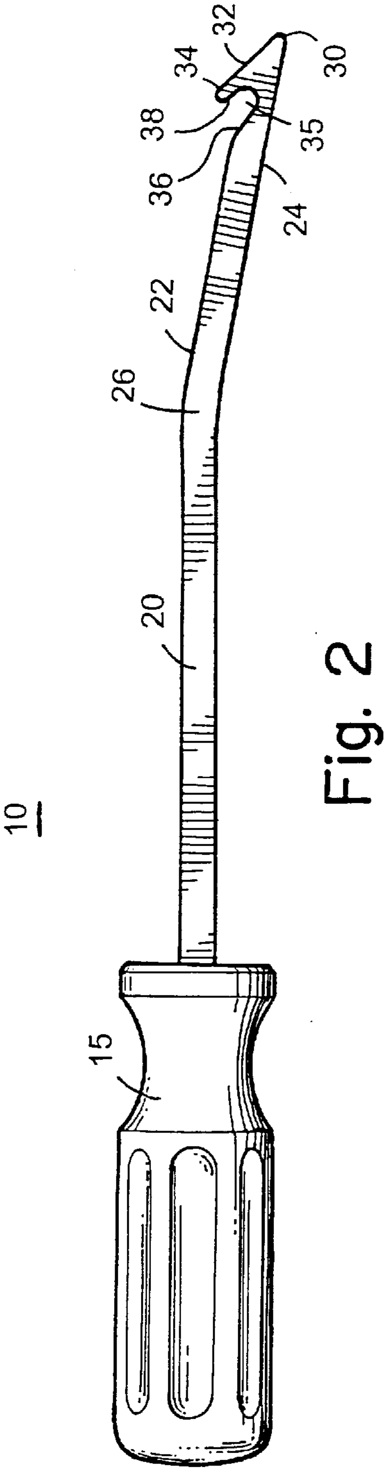
FIG. 2 is a side view of the tool constructed in accordance with the first embodiment of the present invention.

FIG. 2 shows an example of a tool 10 constructed in accordance with the present invention. Tool 10 includes a handle 15 and a shaft 20 attached to handle 15 and extending outward from one end of handle 15. In the exemplary embodiment shown in the drawings, shaft 20 has a generally square or rectangular cross section although shaft 20 may be formed to have virtually any shape cross section. Handle 15 and shaft 20 may be formed of any conventional materials commonly used for screwdrivers and the like and are joined together in a conventional manner. It will be appreciated that handle 15 may take any of various forms as may be required to comply with OSHA standards. At the opposite end of shaft 20 from handle 15, is provided lever means for simultaneously engaging both a coupler of a rearview mirror assembly and a base, which is secured to a vehicle windshield or other vehicle component, to move the coupler relative to the base in response to a levering force applied to handle 15 until the coupler is slid into full engagement with the base.

Figure 3:
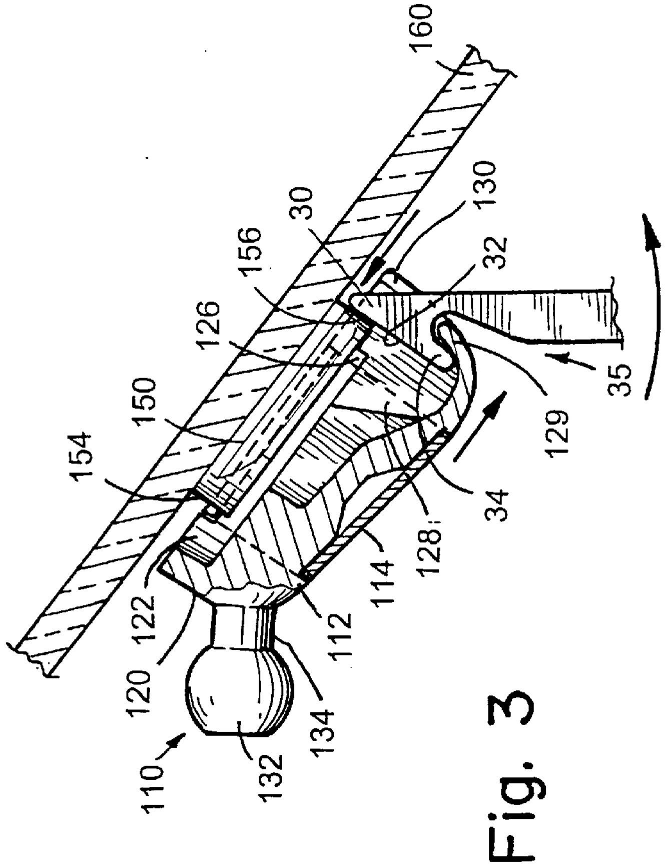
FIG. 3 is a close-up view in partial cross section illustrating the operation of the tool of the present invention.
Figure 5:
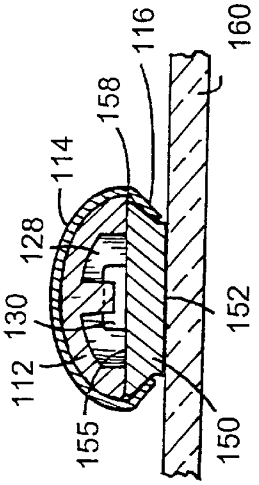
FIG. 5 is a cross-sectional view of a coupler of a rearview mirror assembly secured to a windshield-mounted base.
Figure 7:
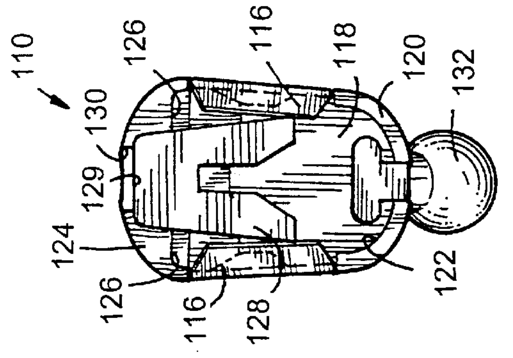
FIG. 7 is a front view of a coupler that is also a component of a prior art rearview mirror-mounting mechanism.
Figure 6:
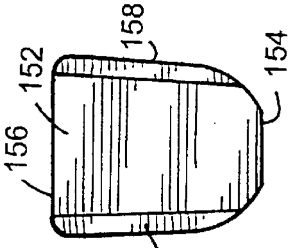
FIG. 6 is a front view of a base that is a component of a prior art mounting mechanism.
Figure 4:
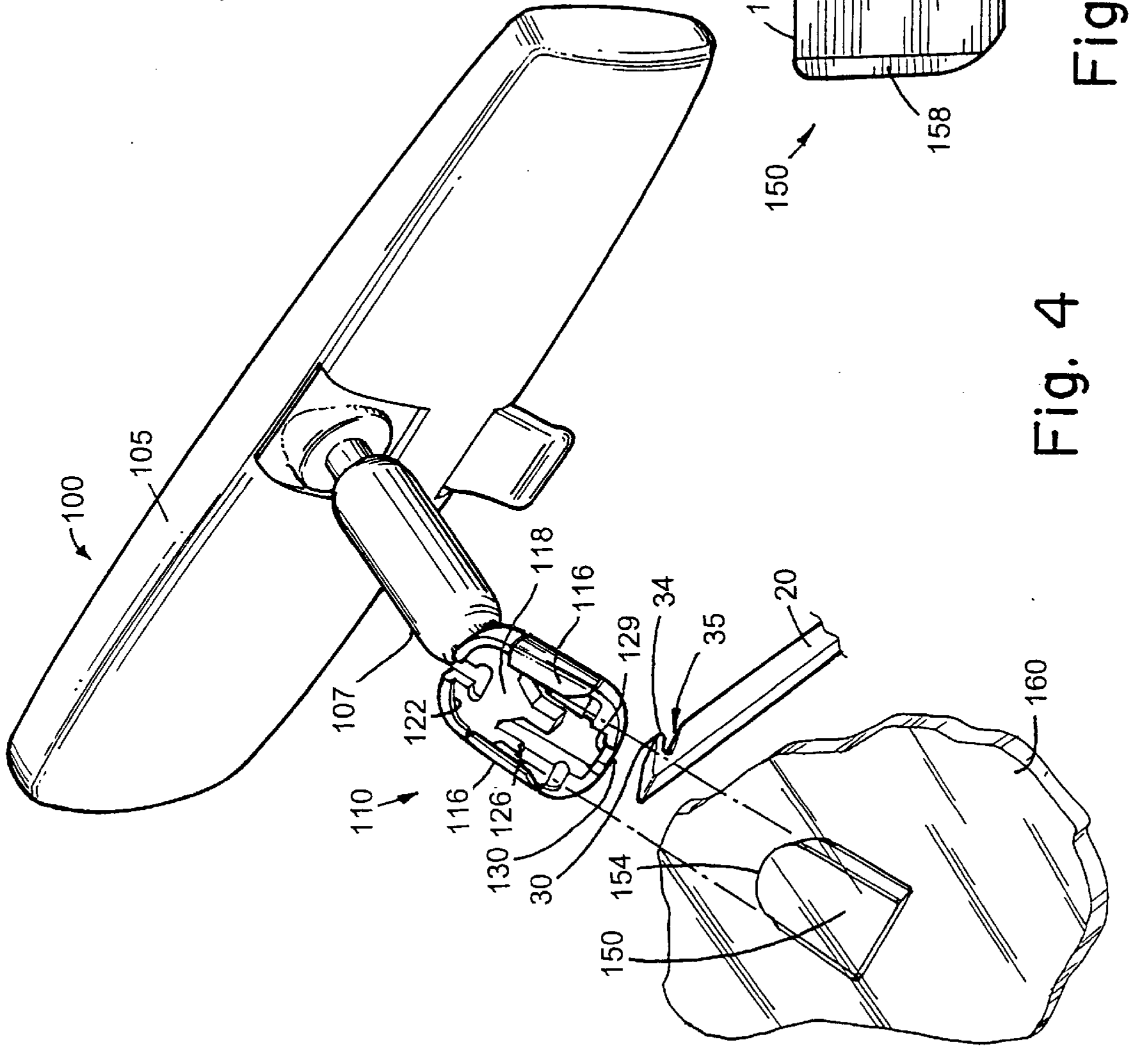
FIG. 4 is a perspective view illustrating the manner in which a rearview mirror is mounted to a windshield-mounted base as well as the use of the tool of the present invention.

As shown in FIGS. 2 and 3, the lever means includes a notch 35 that is formed in a surface 22 of shaft 20 and which is defined by a rearward inner notch wall 36 and a forward inner notch wall 38. Notch 35 cooperates with a hook extension 34 to engage coupler 110 by inserting hook extension 34 into slot 130 of coupler 110 such that forward inner notch wall 38 contacts an inner surface 129 of a rear wall 124 provided on coupler 110. The lever means is further defined by an inclined (i.e., chamfered) end surface 32 that forms a tip 30 at an intersection with a surface 24 of shaft 20 that is opposite surface 22 in which notch 35 is formed. Inclined end surface 32 cooperates with forward inner notch wall 38 to define hook extension 34.

As shown in FIG. 3, when the lever means engages coupler 110, inclined end surface 32 and tip 30 are brought into contact with a bottom end 156 of a base 150 that is adhered to a windshield 160 or other vehicle component. As explained in further detail with reference to FIG. 1 below, when the lever means of tool 10 is engaged with both coupler 110 and base 150 in the manner shown in FIG. 3, and a leverage force is applied by a user to handle 15, the lever means of tool 10 responds by pulling on the inner surface 129 of the rear wall 124 of coupler 110 to slide coupler 110 downward into full engagement with base 150. Thus, as apparent from FIG. 3, notch 35 serves to apply a downward leverage force on an interior surface of coupler 110 about a pivot point on bottom surface 156 of base 150 using inclined end surface 32 and tip 30 provided at one end of tool 10.

Figure 1:
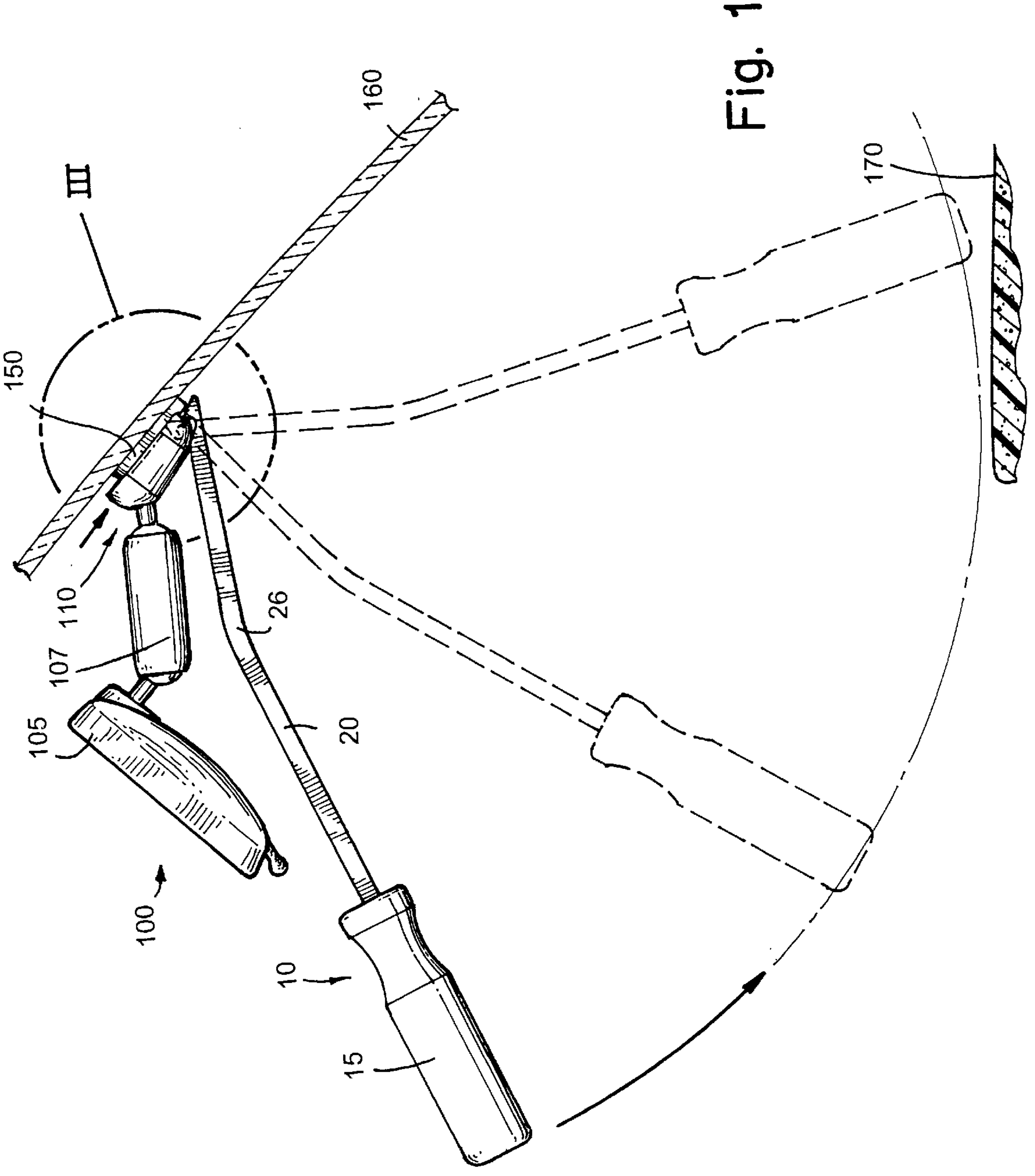
FIG. 1 is a pictorial view of a first embodiment of the tool of the present invention in use.

Due to the confined area in which tool 10 may be used when sliding coupler 110 over a base 150 that is applied to a windshield 160, tool 10 is preferably constructed to have a bend 26 provided in shaft 20. To insert hook extension 34 of tool 10 into slot 130 of coupler 110, the lower portion of shaft 20 is preferably angled relative to coupler 150 to permit hook extension 34 to enter the relatively narrow interior of coupler 110 through notch 130, as shown in FIG. 1. Because the rearview mirror assembly 100 typically will block tool 10 and because any overhead consoles provided on the vehicle headliner would interfere with tool 10 from being positioned at this proper entry angle relative to coupler 110, bend 26 is provided to allow a user to insert the hook extension 34 in the proper manner regardless of the presence of any overhead console or of the inability of the rearview mirror assembly to be pivoted upward and completely out of the way.

As tool 10 is swung downward in the manner shown by the dashed-line representations of tool 10 in FIG. 1, the lever means that engages coupler 110 and base 150 pulls coupler 110 downward over base 150. At the downward end of this swing, obstacles such as the vehicle dash may prevent the tool from swinging far enough to pull coupler 110 completely over base 150. Such obstacles place limits on the length of tool 10 since it may be necessary to swing the tool past the dash adjacent the windshield. The lever means of tool 10 should be constructed such that it will slide coupler 110 downward over base 150 into full engagement prior to a point where handle 110 is obstructed by the vehicle's dash or the vehicle's windshield. In the preferred embodiment shown in the drawings, the lever means of tool 10 accomplishes this task due to the angles at which inclined end surface 32 and notch 35 are formed relative to a central axis of shaft 20 and handle 15, as well as the length of inclined end surface 32.

In a preferred embodiment, the overall length of tool 10 is 10.62 inches although other lengths may be employed for use in different makes and models of vehicles. Clearly, the tool should be made short enough that it avoids obstacles such as the vehicle dash that would prohibit the tool from being swung far enough so as to bring coupler 110 into full engagement with base 150. On the other hand, the shorter the length of tool 10, the more force will be required by the user to bring coupler 110 into full engagement with base 150. Shaft 20 is preferably formed with a 0.25 inch by 0.25 inch square cross section and to have an overall length of 8.75 inches. The center of notch 35 is preferably formed 8.2 inches from the end of shaft 20 that is inserted into handle 15. As explained above, notch 35 is defined by a rearward inner notch wall 36 and a forward inner notch wall 38 that extend at an angle to surface 22 of shaft 20, as well as a circular end which joins these inner notch walls. The radius of this circular arc is preferably 0.10 inch such that the central point of the circular arc is 0.19 inch from the lower surface 24 of shaft 20 and the bottom of notch 35 is 0.09 inch from bottom surface 24. Rearward inner notch wall 36 is preferably angled at 25° relative to bottom surface 24. Forward inner notch wall 38 is preferably substantially parallel with inclined end surface 32, which is preferably formed at a 36° angle relative to bottom surface 24 of shaft 20. Hook extension 34 which is defined by inclined end surface 32 and forward inner notch wall 38 is preferably 0.09 inch thick. Further, the distance between bottom surface 24 of shaft 20 and the end of hook extension 34 along a line perpendicular to bottom surface 24 is preferably 0.41 inch. Bend 26 in shaft 20 preferably results in a 10° angle with respect to upper surface 22 at opposing ends of shaft 20. Bend 26 may be formed by providing an arc-like bend in shaft 20 of 2.5-inch radius from a center point spaced 5.70 inches from the end of shaft 20 that is inserted into handle 15.

Although specific preferred dimensions are provided for tool 10, it will be appreciated by those skilled in the art that tool 10 is not limited to such dimensions. The disclosed dimensions were selected to enable a single tool 10 to be used in most makes and models of vehicles currently on the market. Clearly, the dimensions of tool 10 may be changed in response to any changes made in the design of any future models or in any future change and design of the rearview mirror coupling mechanism without departing from the spirit and scope of the present invention.

Figure 8:
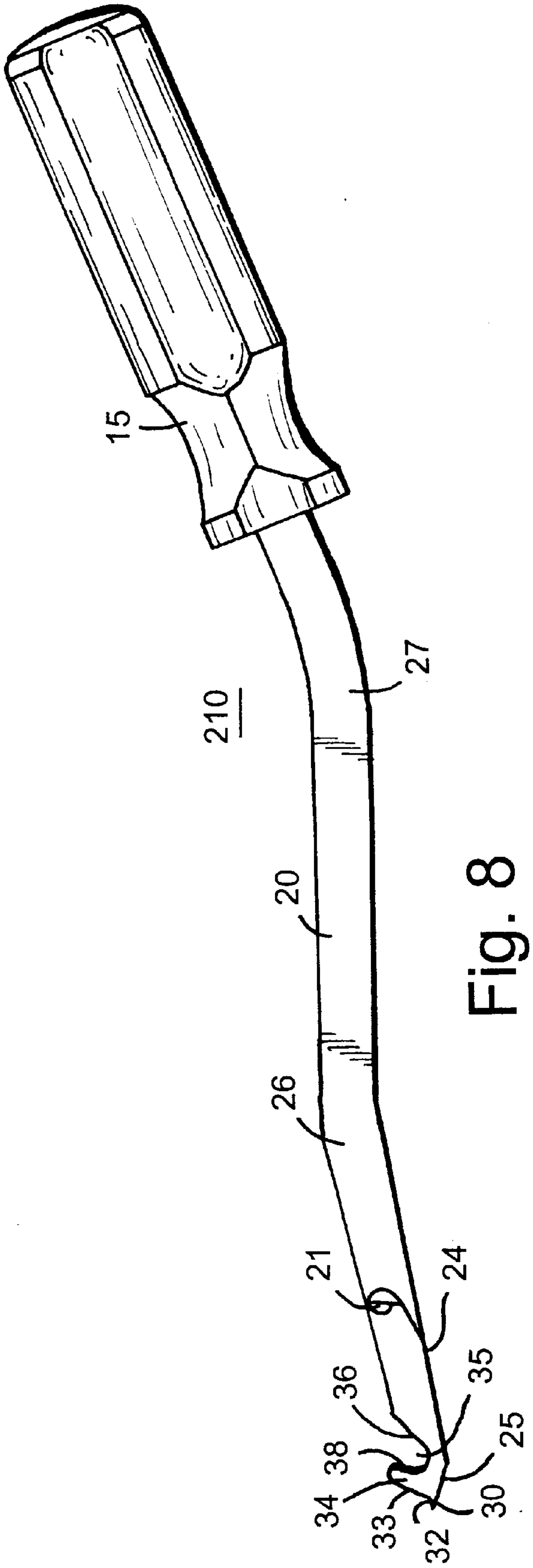
FIG. 8 is a side view of the tool constructed in accordance with a second embodiment of the present invention.

FIG. 8 shows a tool 210 constructed in accordance with a second embodiment of the present invention. Tool 210 differs from tool 10 shown in FIG. 2 in that a second bend 27 in shaft 20 is provided to provide additional room for the tool to be moved toward the windshield at the end of its pivoting motion. Further, bottom surface 24 of shaft 20 includes a bent surface portion 25 that joins levering surface 32 in a sharp point tip 30. Further, levering surface 32 is much shorter and does not form part of protrusion 34 but instead joins surface 33 which forms protrusion 34 with surface 38. Further, shaft 20 is tapered inward along a portion 21 such that the end portion is narrower than the rest of shaft 20. In the preferred construction, the overall length of tool 210 is 10.31 inches and shaft 20 is preferably formed with a 0.38 inch by 0.38 inch square cross section for most of its length and to be tapered to 0.237 inch at the tapered end portion 21. The center of notch 35 is preferably formed 9.95 inches from the end of handle 15. The radius of the circular arc-forming notch 35 is preferably 0.10 inch such that the central point of the circular arc is 0.19 inch from the lower surface 24 of shaft 20 and the bottom of notch 35 is 0.09 inch from bottom surface 24. Rearward inner notch wall 36 is preferably angled at 27° relative to forward inner notch wall 38. Hook extension 34, which is defined by end surface 33 and forward inner notch wall 38 is preferably 0.09 inch thick. Further, the distance between bottom surface 24 of shaft 20 and the end of hook extension 34 along a line perpendicular to surface 24 is preferably 0.40 inch. Bend 26 in shaft 20 preferably results in a 13° angle with respect to upper surface 22 at opposing ends of shaft 20. Bend 27 in shaft 20 preferably results in a 22° angle with respect to bottom surface 24 at opposing ends of shaft 20. The length of surface 32 is preferably 0.09 inch and the angle between surfaces 25 and 24 is preferably 33°. Further, the distance between the intersection of surfaces 32 and 33 in the center of the circular arc that forms notch 35 is preferably 0.270 inch. Again, although specific dimensions are provided in this example, other dimensions may certainly be used without departing from the spirit or scope of the present invention.

Further, although the present invention has been described as being designed for use with a particular rearview mirror mounting mechanism, those skilled in the art will recognize that the tool described herein may be used with other types of mounting mechanisms for rearview mirrors or other vehicle components and accessories. Additionally, other uses for the disclosed tool may become apparent to those skilled in this and other arts.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

The embodiments of the invention in which an exclusive property or privilege is claimed are defined as follows:

1. A tool for snapping a coupler of a rearview mirror assembly onto a base mounted to a vehicle, said tool comprising:

a handle;

a shaft attached to and extending outward from said handle; and lever means formed on an end of said shaft opposite said handle for simultaneously engaging both the coupler of the rearview mirror assembly and the base when the coupler is initially partially engaged with the base, and for moving the coupler relative to the base in response to a levering force applied to said handle until the coupler of the rearview mirror assembly is slid into full engagement with the base.

2. The tool as defined in claim 1, wherein said shaft includes a bend in a central region thereof.

3. The tool as defined in claim 1, wherein said lever means includes a notch formed in said shaft for engaging the coupler of the rearview mirror assembly and a tip formed as a chamfered end of said shaft for engaging the base.

4. The tool as defined in claim 3, wherein said notch is defined by two interior side walls extending into said shaft at an angle relative to an exterior surface of said shaft.

5. The tool as defined in claim 3, wherein:

the base has a generally rectangular shape defined by a bottom surface adapted to be secured to the windshield, a top surface, two side surfaces, an upper end, and a lower end, with dovetails formed along said two side surfaces;

the coupler includes a recess for receiving the base, said recess being defined by a front wall, a rear wall, and flanges of a spring clip extending between the front and rear walls of the coupler for engaging the dovetails of the base; and said lever means is partially inserted into the recess in the coupler to enable said notch to engage an interior surface of the rear wall of the coupler and to enable said tip to contact the lower end of the base such that a levering force is directly applied to the interior surface of the rear wall of the coupler in response to a directional force applied to said handle.

6. The tool as defined in claim 1, wherein:

the base has a generally rectangular shape defined by a bottom surface adapted to be secured to the windshield, a top surface, two side surfaces, an upper end, and a lower end, with dovetails formed along said two side surfaces;

the coupler includes a recess for receiving the base, said recess being defined by a front wall, a rear wall, and flanges of a spring clip extending between the front and rear walls of the coupler for engaging the dovetails of the base; and said lever means is partially inserted into the recess in the coupler to engage an interior surface of the rear wall of the coupler and to engage the lower end of the base.

7. A tool for snapping a coupler of a rearview mirror assembly onto a base mounted to a vehicle, said tool comprising:

a handle;

a shaft attached to and extending outward from said handle; and lever means formed on an end of said shaft opposite said handle for simultaneously engaging both the coupler of the rearview mirror assembly and the base when the coupler is initially partially engaged with the base, and for moving the coupler relative to the base in response to a levering force applied to said handle until the coupler of the rearview mirror assembly is slid into full engagement with the base;

said lever means including a notch formed in said shaft for engaging the coupler of the rearview mirror assembly and a tip formed as a chamfered end of said shaft for engaging the base;

said notch being defined by two interior side walls extending into said shaft at an angle relative to an exterior surface of said shaft;

said two interior side walls both extend into said shaft at substantially the same angle relative to the exterior surface of said shaft.

8. The tool as defined in claim 7, wherein said two interior side walls extend into said shaft at substantially the same angle as said chamfered end surface relative to the exterior surface of said shaft.

9. A tool for snapping a coupler of a rearview mirror assembly onto a base mounted to a vehicle, said tool comprising:

a handle;

a shaft attached to and extending outward from said handle;

a substantially flat inclined end surface formed on an end of said shaft opposite said handle; and a notch formed in said shaft for engaging the coupler of the rearview mirror assembly, wherein, after the coupler of the rearview mirror assembly is initially partially engaged with the base, said notch is brought into engagement with the coupler and said inclined end surface is brought into engagement with the base such that the coupler is moved relative to the base by a lever action resulting from a force applied to said handle until the coupler is slid into full engagement with the base.

10. The tool as defined in claim 9, wherein said shaft includes a bend in a central region thereof.

11. The tool as defined in claim 10, wherein said shaft extends outward from said handle along a central axis of said handle and said shaft includes an upper surface in which said notch is formed, said bend in said shaft being provided such that said upper surface of said shaft is bent downward.

12. The tool as defined in claim 9, wherein said notch is defined by two interior side walls extending into said shaft at an angle relative to an exterior surface of said shaft.

13. The tool as defined in claim 9, wherein:

the base has a generally rectangular shape defined by a bottom surface adapted to be secured to the windshield, a top surface, two side surfaces, an upper end, and a lower end, with dovetails formed along said two side surfaces;

the coupler includes a recess for receiving the base, said recess being defined by a front wall, a rear wall, and flanges of a spring clip extending between the front and rear walls of the coupler for engaging the dovetails of the base; and said inclined end surface is partially inserted into the recess in the coupler to enable said notch to engage an interior surface of the rear wall of the coupler and to enable said inclined end surface to contact the lower end of the base such that a levering force is directly applied to the interior surface of the rear wall of the coupler in response to a directional force applied to said handle.

14. A tool for snapping a coupler of a rearview mirror assembly onto a base mounted to a vehicle, said tool comprising:

a handle;

a shaft attached to and extending outward from said handle;

an inclined end surface formed on an end of said shaft opposite said handle; and a notch formed in said shaft for engaging the coupler of the rearview mirror assembly, said notch being defined by two interior side walls extending into said shaft at an angle relative to an exterior surface of said shaft, said two interior side walls both extending into said shaft at substantially the same angle relative to the exterior surface of said shaft, wherein, after the coupler of the rearview mirror assembly is initially partially engaged with the base, said notch is brought into engagement with the coupler and said inclined end surface is brought into engagement with the base such that the coupler is moved relative to the base by a lever action resulting from a force applied to said handle until the coupler is slid into full engagement with the base.

15. The tool as defined in claim 14, wherein said two interior side walls extend into said shaft at substantially the same angle as said inclined end surface relative to the exterior surface of said shaft.

16. A method of installing a rearview mirror assembly in a vehicle, the rearview mirror assembly including a coupler and a base, said method comprising the steps of:

securing the base to the interior of the vehicle;

sliding the coupler partially over the base; and applying a levering force directly to an interior surface of the coupler until the coupler is slid into full engagement with the base.

17. The method as defined in claim 16, wherein said step of applying a levering force includes the substeps of:

providing a tool capable of applying the levering force directly to an interior surface of the coupler in response to a directional force applied to the tool;

inserting the tool into the coupler until the tool engages the interior surface of the coupler; and applying such a directional force to the tool until the coupler is slid into full engagement with the base.

18. The method as defined in claim 16, wherein said step of applying a levering force includes the substeps of:

providing a tool having a handle, a shaft attached at one end to the handle, and a notch formed in the shaft proximate an end of the shaft opposite the handle;

engaging the interior surface of the coupler to which the leverage force is to be applied with a surface of the tool's notch;

moving the handle to bring the end of the shaft into contact with the base; and applying a directional force to the handle such that the directional force is translated by the shaft and the notch to a levering force applied to the interior surface of the coupler.

19. A tool comprising:

a handle having a generally cylindrical shape defining a central axis; and a shaft having one end attached to said handle and extending outward from said handle along the central axis of said handle in the vicinity of said handle and extending at an angle to the central axis of said handle at an opposite end thereof, said shaft including:

a notch formed in the vicinity of the end of said shaft opposite said handle, said notch being defined by two interior side walls extending into said shaft at an angle relative to an exterior surface of said shaft, and a tip formed at the end of said shaft opposite said handle, said tip being defined by an exterior surface of said shaft opposite said notch and a chamfered surface of said shaft, said chamfered surface being substantially flat.

20. The tool as defined in claim 19, wherein said chamfered surface is formed at the end of said shaft substantially in parallel with the interior side walls that define said notch.

21. The tool as defined in claim 19, wherein said exterior surface of said shaft in which said notch is formed is an upper surface, and said bend in said shaft being provided such that said upper surface of said shaft is bent downward.

* * * * *